M. L. NIX.
Harvester Rakes.

No. 141,164. Patented July 22, 1873.

WITNESSES.
E. H. Bates
Phil. E. Mari

INVENTOR.
Manning L. Nix
Chipman Hosmer & Co
Attys

UNITED STATES PATENT OFFICE.

MANNING L. NIX, OF CHETOPAH, KANSAS.

IMPROVEMENT IN HARVESTER-RAKES.

Specification forming part of Letters Patent No. 141,164, dated July 22, 1873; application filed June 14, 1873.

*To all whom it may concern:*

Be it known that I, M. L. NIX, of Chetopah, in the county of Labette and State of Kansas, have invented a new and valuable Improvement in Sheaf-Rakes for Reapers; and I do hereby declare that the following is a full, clear, and exact description of the construction and operation of the same, reference being had to the annexed drawings making a part of this specification, and to the letters and figures of reference marked thereon.

Figure 1:
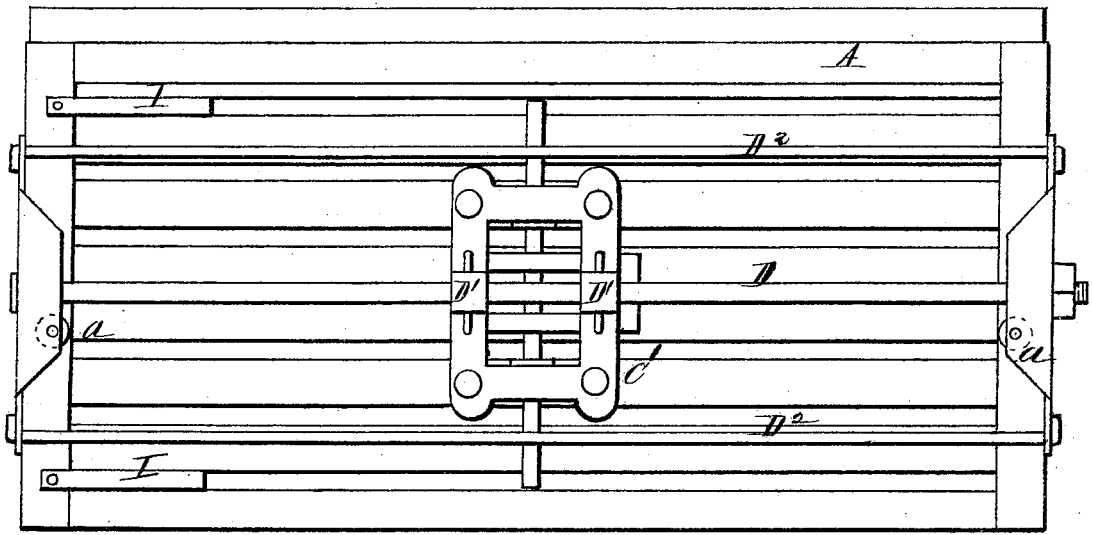
Figure 2:
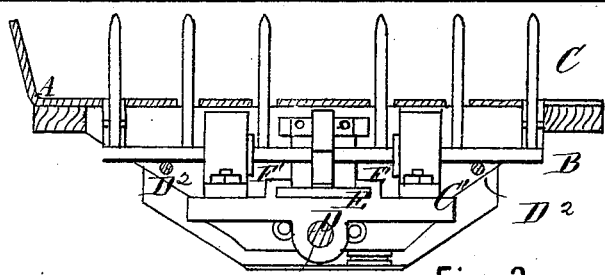
Figure 3:
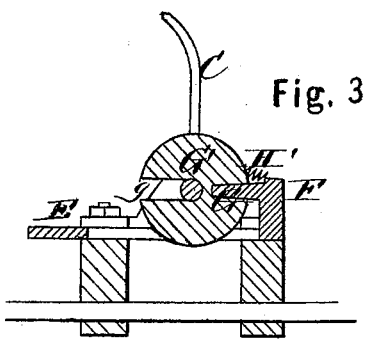
Figure 4:
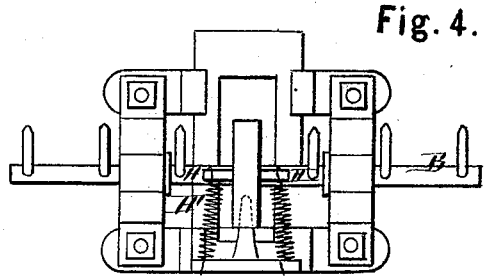

Figure 1 of the drawings is a representation of a plan bottom view of the platform. Fig. 2 is a cross-section of my invention. Fig. 3 is a detail section of my invention. Fig. 4 is a detail view of my invention.

My invention has relation to rakes for reaping-machines; and it consists in the construction and novel arrangement of a pivoted rake, and of the actuating devices appertaining thereto, whereby said rake is propelled along and underneath a slatted platform, with its tines standing upright and projecting between the slats, until it reaches the end or side from which the grain is to be dropped, and is then turned back so that its tines shall lie underneath the platform, and while in this position its traveling motion reversed until it arrives at the front end of the platform, whereupon the tines are again raised and the rake again moved toward the delivery end of the platform, all substantially as and for the purpose hereinafter fully described.

Referring to the accompanying drawings, A designates a reaper-platform, of an oblong rectangular form, and composed principally of slats running lengthwise, and arranged with spaces between them. The cutter-bar is arranged at one side of said platform, lengthwise of the same, and is actuated by any suitable means. The rake consists of the horizontal bar B, lying underneath the platform and transversely arranged, and armed with the curved tines C, corresponding in relative arrangement to the interstices or slots of the platform, through which they rise and fall.

In Fig. 1 of the drawings the right hand represents the grain side, and the left hand the stubble side, of the platform. The grain is caught by the rake at or near the grain side and delivered from the stubble side. When the rake reaches the grain side of the platform the tines rise and are held up until the stubble side is reached, whereupon they fall, so as not to touch the grain while moving forward, and while in this position the rake is moved to the opposite end.

To obtain this motion of the rake the following-described means are employed: The rake-bar B is pivoted to a frame, C', which travels along a rod, D, arranged underneath the platform. $D^1$ represents the eyes or brackets through which said rod passes. $D^2$ represents rods parallel with the rod D, and designed to support the bar B and to prevent it from canting or bending. E represents a slide, held in proper position upon the frame C' by means of flanges E'. F is a standard at the end of said slide; G, a stud projecting from said standard toward the rake; G', a wheel secured to the rake-bar B, and formed with a recess to receive the stud G when the tines are in an upright position. H are ears on the sides of the wheel G, and H' springs connecting these ears to others projecting from the sides of the standard F. I designates arms projecting from the front end of the platform into slots of the latter, in such positions that the under sides of the approaching tines shall come in contact with their ends.

Now, suppose the tines to be lying down while the rake is approaching the stubble end of the platform; the adjacent end of the slide E will then project beyond the end of the frame C', and the stud G will be free from the wheel G'. As soon as the tines touch the arms I they will be lifted to an upright position and the recess in the wheel G' brought opposite the stud G, after which the slide will come in contact with the end of the platform and be pushed back, causing the stud to enter the recess and to hold the tines upright. The rake now moves back, raking the grain with it until the slide reaches the delivery end of the platform, when the slide is moved back, and the stud thereby withdrawn from the wheel G'. The springs H' then act upon the rake and pull the tines down.

The reciprocating movement of the rake may be given to it by any suitable means.

*a a* designate pulleys, around which pass cords from the frame C' to the devices which propel said frame. The wheel G' has a recess, *g*, cut from one side to the center to allow the rake-bar to be fitted thereto.

What I claim as my invention, and desire to secure by Letters Patent, is—

1. The pivoted rakes B, recessed wheel G', slide E, stud G, reciprocating frame C', and slatted grain-platform A, combined substantially as and for the purpose specified.

2. The springs H', in combination with the pivoted rake B, slatted platform A, slide E, and reciprocating frame C', substantially as specified.

In testimony that I claim the above I have hereunto subscribed my name in the presence of two witnesses.

MANNING L. NIX.

Witnesses:
JOHN W. HOMER,
T. W. FRYE.